United States Patent
Li et al.

(10) Patent No.: US 7,208,243 B2
(45) Date of Patent: Apr. 24, 2007

(54) PROTON EXCHANGE MEMBRANES USING CYCLOADDITION REACTION BETWEEN AZIDE AND ALKYNE CONTAINING COMPONENTS

(75) Inventors: Wen Li, Ann Arbor, MI (US); John Muldoon, Saline, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 0 days.

(21) Appl. No.: 11/290,159

(22) Filed: Nov. 30, 2005

(65) Prior Publication Data

US 2006/0154129 A1 Jul. 13, 2006

Related U.S. Application Data

(60) Provisional application No. 60/632,249, filed on Dec. 1, 2004.

(51) Int. Cl.
*H01M 8/10* (2006.01)
(52) U.S. Cl. .......................... 429/33; 521/25
(58) Field of Classification Search ................. 429/33; 521/25
See application file for complete search history.

(56) References Cited

U.S. PATENT DOCUMENTS

| 5,741,408 A | 4/1998 | Helmer-Metzmann |
| 6,090,895 A | 7/2000 | Mao |
| 6,214,488 B1 | 4/2001 | Helmer-Metzmann |

| 2004/0116546 A1 | 6/2004 | Kosek |

FOREIGN PATENT DOCUMENTS

| WO | WO 97/19480 | 5/1997 |
| WO | WO 00/72395 A2 | 11/2000 |
| WO | WO 03/101972 A1 | 12/2003 |

OTHER PUBLICATIONS

Buchi et al., Performance of Differently Cross-Linked, Partially Fluorinated Proton Exchange Membranes in Polymer Electrolyte Fuel Cells, *J. Electrochem. Soc.* vol. 142, 3044. 1995.
Kolb et al, The Growing Impact of Click Chemistry on Drug Recovery, *Drug Discovery Today* 8 1128, 2003.
Diaz et al., Click Chemistry in Materials Synthesis. 1. Adhesive Polymers from Copper-Catalyzed Azide-Alkyne Cycloaddition, *Journal of Polymer Science Part A*, 42 3492, 2004.
Peng et al., Efficiency and Fidelity in a Click-Chemistry Route to Triazole Dendrimers by the Copper(I)-Catalyzed Ligation of Azides and Alkynes, *Angew. Chem. Int. Ed.* 43, 3928, 2004.
Borman, In Situ Click Chemistry, *Cenear* 80 6 29, 2002.

*Primary Examiner*—Patrick Joseph Ryan
*Assistant Examiner*—Thomas H. Parsons
(74) *Attorney, Agent, or Firm*—Gifford, Krass, Sprinkle, Anderson & Citkowski, P.C.

(57) ABSTRACT

A process for making an ion-conducting polymer comprises cross-linking polymers having functional groups such as alkyne groups and azide groups. An example ion-conducting polymer has cross-links including nitrogen-containing heterocycles formed by the reaction between the functional groups, such as 1,2,3-triazole groups formed by a cycloaddition reaction between alkyne and azide groups. The ion-conducting polymer may be used in an ion-electrolyte membrane. Examples include a proton-electrolyte membrane useful for fuel cells.

20 Claims, 1 Drawing Sheet

PROTON EXCHANGE MEMBRANES USING CYCLOADDITION REACTION BETWEEN AZIDE AND ALKYNE CONTAINING COMPONENTS

REFERENCE TO RELATED APPLICATION

This application claims priority of U.S. Provisional Patent Application Ser. No. 60/632,249, filed Dec. 1, 2004, the entire content of which is incorporated herein by reference.

FIELD OF THE INVENTION

The invention relates to polymers, such as cross-linked proton-exchange membranes (PEMs) used in fuel cells.

BACKGROUND OF THE INVENTION

Ion-exchange membranes have numerous applications. In particular, proton-exchange membranes (PEMs) are used in fuel cells, and such applications have caused great interest in proton-conducting polymers.

Ideally, a PEM has high proton conductivity, low electron conductivity, dimensional stability (low swelling in water), oxidative, reductive and hydrolytic stability, and low fuel cross-over rates (e.g. low methanol cross-over for direct methanol fuel cells, or low hydrogen or nitrogen cross-over for $H_2/O_2$ fuel cells). To date, reported membranes that conduct protons at moderate temperature also possess high methanol and hydrogen permeability and suffer from poor dimensional stability.

The great tendency of a PEM to swell in hot water has led to development of cross-linking methods with the aim of improving mechanical stability. Buchi et al. (*J. Electrochem. Soc.*, 142, 3044 (1995)) reported materials synthesized using a sulfonated cross-linked polyolefin-polystyrene copolymer. The polymer is cross-linked during polymerization by the addition of divinyl benzene in the presence of radical initiator.

International Patent Application WO 97/019480 to Yen et al. discloses that sulfonated polymers will form direct bonds therefore cross-linking the polymer chains. However, this reaction decreases the ion exchange capacity and therefore the proton conductivity.

U.S. Pat. No. 6,090,895 to Mao et al. discloses partially cross-linked polymers through activation of the sulfonic acids groups via conversion to the sulfonic acid chloride/bromide with subsequent reaction with aromatic/aliphatic diamines. This sulfonamide cross-linking is not sufficiently stable to hydrolysis for fuel cell application and use of the sulfonic acid groups decreases the ion exchange capacity and therefore the proton conductivity.

International Patent Application WO 00/072395 to Pintauro et al. discloses the cross-linking of sulfonated polyphosphazene in the presence of ultraviolet light and benzophenone. U.S. Patent Publication No. 2004/0116546 to Kosek et al. discloses imbibing a perfluorocarbon membrane with styrene monomer and vinyl benzene to yield a cross-linked polymer within the perfluorocarbon membrane.

However, the disclosed polymers fail to provide desired properties, particularly in relation to fuel cell applications. Reported membranes possess high methanol and hydrogen permeability, and suffer poor dimensional stability.

SUMMARY OF THE INVENTION

Embodiments of the present invention include cross-linked ion-conducting polymers, ion-exchange membranes including these cross-linked ion-conducting polymers, and apparatus using the ion-exchange membranes. Cross-linked ion-conducting polymers include polymers cross-linked by a cycloaddition reaction between terminal azide and alkyne groups, to form cross-links having a triazole group formed by the cycloaddition reaction. In particular, cross-linked proton-conducting polymers are disclosed that are useful for proton-exchange membranes (PEMs) used in fuel cells and other apparatus. Proton exchange membranes are also sometimes referred to as polymer electrolyte membranes.

Cross-linking a proton-conducting polymer improves mechanical and dimensional stability of a PEM including the polymer, and can significantly reduce fuel cross-over rates in fuel cell applications by decreasing the free volume of the membrane. Proton-conducting polymers according to the present invention may further include acid groups, to enhance proton conductivity. Example polymers include sulfated polymers.

A process for making an ion-conducting polymer comprises providing a first polymer having a first functional group, providing a second polymer having a second functional group and cross-linking the first polymer and the second polymer using a cycloaddition reaction between the first functional group and the second functional group, so as to form the ion-conducting polymer, the ion-conducting polymer having cross-links including a nitrogen-containing heterocycle formed by the cycloaddition reaction. The first polymer and/or the second polymer may be acid polymers, for example including acid groups such as sulfonic acid or phosphonic acid.

An ion-exchange membrane according to the present invention comprises an ion-conducting polymer having cross-links, the cross-links including a 1,2,3-triazole group. The ion-exchange membrane may be a proton-exchange membrane, for example as used in a fuel cell according to the present invention. A membrane electrode assembly (MEA) according to the present invention includes a first electrode, a second electrode, and an ion-exchange membrane according to the present invention sandwiched the electrodes. A membrane electrode assembly according to the present invention may be used in an improved fuel cell or other apparatus.

DETAILED DESCRIPTION OF THE INVENTION

Figure 1:
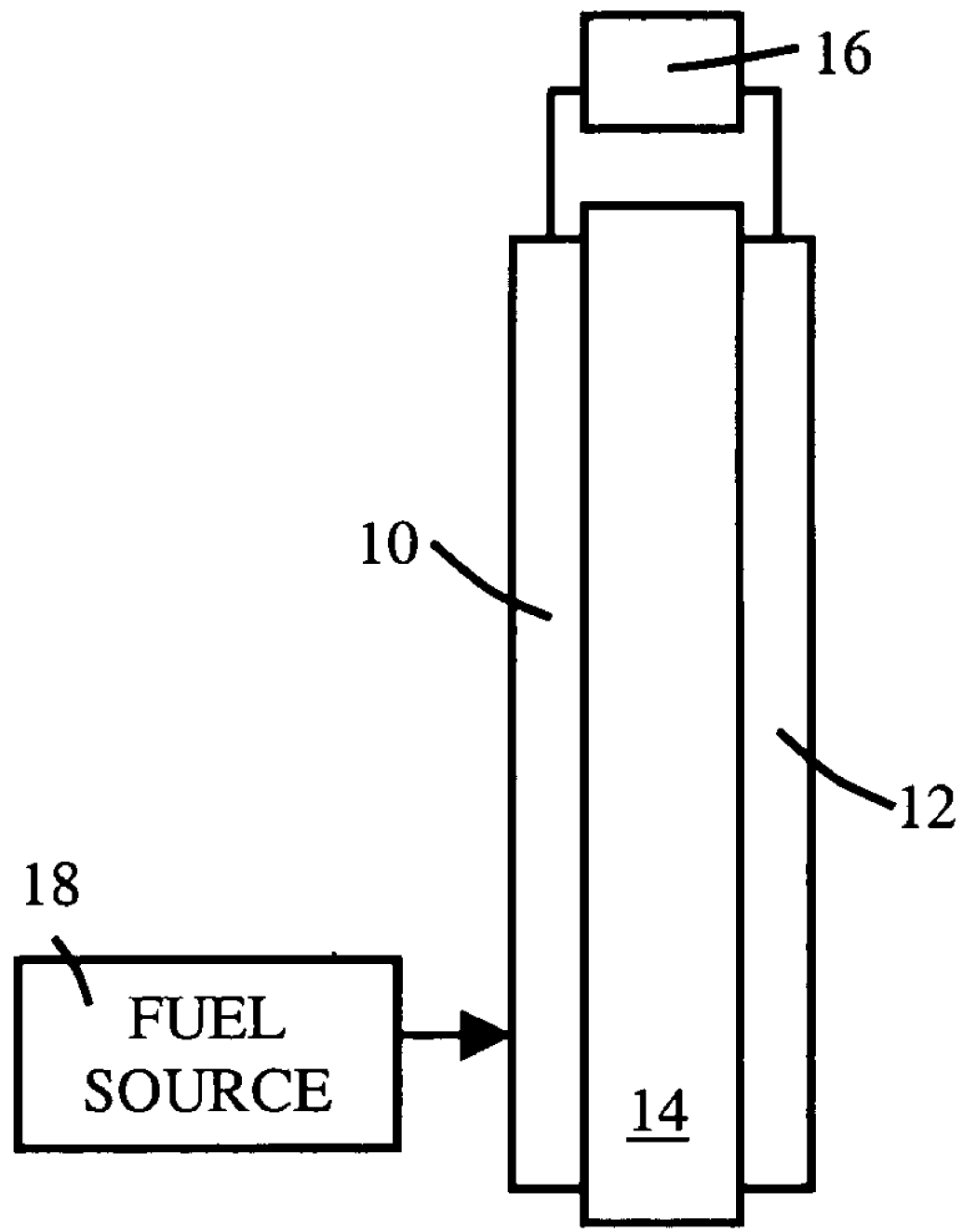
FIG. 1 is a simplified schematic of a polymer electrolyte fuel cell.

Improved cross-linked polymers, and processes for making them, are described. The cross-linked polymers can be used in ion-exchange membranes (sometimes also referred to as ion-electrolyte membranes). The ionic species of interest may be protons, alkali ions, or other ions, depending on the application. In examples below, proton-conducting polymers are discussed. However, the invention is not limited to proton-conducting materials, as the approach can be used with other ion-conducting polymers and membranes made therefrom.

A fuel cell typically includes an anode, a cathode, a fuel source, and a proton-exchange membrane (PEM) located between the anode and the cathode. The PEM includes a proton-conducting polymer, but may also include additional materials chosen to improve proton conductivity, or other electrical property, mechanical property, or other property.

The cross-linking process effectively reduces free volume and increases stability (thermal and mechanical) of the cross-linked polymers, which can result in a significant decrease of gas permeation, membrane degradation, and cost of membrane production. Thus, the processes and proton-conducting polymers according to the present invention are useful for application in a proton exchange membrane (PEM) fuel cell (FC).

In representative examples of the invention, the cross-linking process may include the copper(I)-catalyzed coupling of azide and terminal alkyne groups to form 1,2,3 triazole groups, or other similar catalytic reaction processes. Example processes according to the present invention provide a PEM comprising a cross-linked proton-conducting polymer, which may have greatly enhanced dimensional and mechanical stability and reduced fuel crossover rates compared to a conventional PEM.

In an example of the present invention, a cycloaddition reaction between azide and alkyne group containing compounds is used to synthesize a cross-linked proton conducting polymer for use in a PEM. The copper(I)-catalyzed cycloaddition reaction between an azide and a terminal alkyne group gives a 1,2,3-triazole. Hence, the resulting proton-conducting polymer has cross-links including triazole moieties formed by the cycloaddition. The stability of the PEM is improved by the cross-linking, and the free volume can be reduced. Also, the presence of nitrogen-containing heterocycles further enhances the proton conductivity.

Scheme 1 below shows an example reaction:

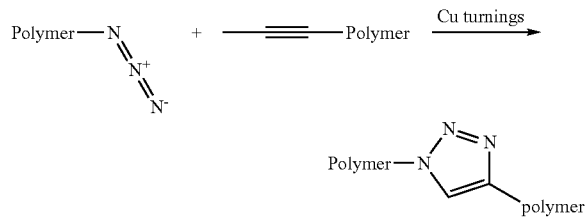

Scheme 1

The reaction between azide and alkyne groups, as shown in Scheme 1, is described in more detail in relation to drug discovery by H. C. Kolb and K. B. Sharpless, *Drug Discovery Today*, 8 1128–1137 (2003). The reaction rate of the cycloaddition is greatly enhanced by copper(I) catalysis.

Scheme 1 illustrates a first polymer having an azide group cross-linking to a second polymer having an alkyne group. The formed cross-link includes a triazole group. The functional groups, in this case azide and alkyne groups, may be directly attached to the polymer backbone or attached through a linking group. Polymer backbones may include a plurality of functional groups, which may be the same or different. For example, a single polymer species may include both azide and alkyne groups, and cross-link with itself.

The cycloaddition of alkynes and azides to form a 1,4-substituted 1,2,3-triazole is sometimes termed a "click reaction". The term click reaction generally refers to a reaction between a carbon atom and a heteroatom that is irreversible, highly energetically favored, goes largely to completion, and occurs between two groups that are generally unreactive except with respect to each other. Other click reactions, including other cycloaddition reactions that form a nitrogen-containing heterocycle within a cross-link, can be used to prepare a cross-linked polymer according to the present invention. Other examples include reactions involving a carbon atom of a first polymer and a heteroatom (such as oxygen, sulfur, or nitrogen) of a second polymer to form a cross-link including a heterocycle, the heterocycle including the heteroatom. Example cross-linking reactions further include reactions of a carbonyl group of a first polymer with a second polymer to form a cross-link including an aromatic heterocycle, and other additions to carbon-carbon multiple bonds, such as epoxidation.

Functional groups may be groups, such as terminal groups, of side-chains attached to a polymer backbone, or directly attached to the backbone through chemical bonds.

The azide-alkyne cycloaddition reaction has never before been used to prepare cross-linked proton-conducting polymers for application in proton exchange membranes. The formed triazole groups are stable against oxidation, reduction, or hydrolytic cleaving. Hence, the formed cross-linked polymers are well suited for use in fuel cell applications. The triazole groups also provide nitrogen heteroatoms, which enhance the proton conductivity of the membrane.

The azide-alkyne reaction is described in relation to the synthesis of triazole polymers, used to adhere metals together, in Diaz et al., *J. Poly. Sci.* Part A, 42, 4392–4403 (2004). This reaction has also been used in the synthesis of dendrimers, as described in Wu et al., *Angew. Chem. Int. Ed.*, 43, 3928–3932 (2004). However, these and other references, while providing further details of experimental conditions under which the reaction occurs, fail to suggest the fabrication of PEMs using this approach.

In examples of the present invention, the azide-alkyne cycloaddition reaction is used to make cross-linked polymers, including cross-linked acidic polymers, such as cross-linked polyether ketones, sulfonated polystyrenes, sulfonated polyphenylenes, sulfonated trifluorostyrene derivatives, sulfonated polyphosphazene, fluorinated polymers such Nafion, fluorinated sulfonamide, zwitterionic ionenes, other ionenes, ionomers, sulfonated polysulfone, sulfonated polyimides, sulfonated polyazole, sulfonated silicones and polyimidazole. The cross-linking process can also be used to make phosphonated analogs of the above polymers.

Processes according to the present invention provide cross-linked PEMs through generation of oxidatively and hydrolytically stable cross-links, without a decrease in the ion exchange capacity, and therefore the proton conductivity. Furthermore the triazole groups aid transport protons through the membrane, and therefore improve proton conductivity at low relative humidity. Hence, the cycloaddition reaction between azide and alkyne group containing compounds allows synthesis of improved proton-conducting materials. The cross-linked proton-conducting polymers made through such process are useful for PEMs for fuel cell applications.

Cross-linked acidic polymers prepared by this method may include cross-linked polyether ketones, sulfonated polystyrenes, sulfonated polyphenylenes, sulfonated trifluorostyrene derivatives, sulfonated polyphosphazene, fluorinated polymers such Nafion, fluorinated sulfonamide, zwitterionic ionenes, sulfonated polysulfone, sulfonated polyimides, sulfonated polyazole, sulfonated silicones and polyimidazole.

In examples according to the present invention, a first polymer is provided having one or more azide groups, a second polymer is provided having one or more alkyne groups, and a cross-linked polymer is formed by a cycloaddition of the azide groups with alkyne groups to form cross-links including a triazole group. The first and second polymers may be the same type. For example, a single polymer can have both azide groups and alkyne groups. The polymer can then be cross-linked by cycloaddition reactions between azide groups and alkyne groups on adjacent polymer molecules.

An improved proton exchange membrane (PEM) includes a cross-linked proton-conducting polymer having cross-links including nitrogen-containing heterocycle. In a specific example, the nitrogen-containing heterocycle is a triazole group formed by cycloaddition of an azide and an alkyne.

Ion-conducting polymers according to the present invention may include additional groups, for example to improve ion conductivity. Additional groups may include acid groups, other groups providing a lone pair of electrons (such as nitrogen-containing heterocycles), and the like. Acid groups may include sulfonic acid groups, phosphonic acid groups, boronic acid groups, and/or other acid groups. Hence, the polymer chains of a cross-linked proton conducting polymer may further include acid groups attached thereto.

Cycloaddition may also take place between a polymer and a non-polymer compound. In one representative example, a polymer is provided with azide groups, and a non-polymer compound includes one or more alkyne groups. A cross-link can be formed by reactions between the polymer and the non-polymer, for example to form a network of the form X—Y—M—Y—X, where X is a polymer, M is a non-polymer, and the Y groups include a ring structure formed by cycloaddition. Alternatively, the polymer may have alkyne groups, and the non-polymer may have azide groups, or the both the polymer and non-polymer may have azide and alkyne groups.

For cross-linking with itself, a polymer may include approximately equal numbers of alkyne and azide groups. In other examples, there may be a surplus of one or other group, and the excess groups, not used in cross-linking, may be used to attach other groups to the polymer. For example, acid-containing moieties may be attached to the polymer using the same click reaction used to cross-link the polymer.

Cross-linked polymer networks according to the present invention include networks having a cross-linking group including a nitrogen-containing heterocycle, for example formed by a cycloaddition reaction during the cross-linking process. For example, copper(I)-catalyzed cycloaddition reactions between azides and terminal alkynes gives 1,2,3 triazoles. In other examples, other cycloaddition reactions can be used to cross-link a proton-conducting polymer, giving cross-links including a nitrogen-containing heterocycle.

Examples of the present invention include ion-conducting cross-linked polymers having the general form X—Y—Z, wherein X is a first polymer, Y is a cross-link including a triazole group, and Z is a second polymer which may be the same species as X, or different. X and/or Z may be an ion-conducting polymer in a cross-linked state, such as an acid polymer or sulfonated polymer. X may be selected from a group of polymers consisting of polyether ketones, sulfonated polystyrenes, sulfonated polyphenylenes, sulfonated trifluorostyrenes, sulfonated polyphosphazenes, fluoropolymers, fluorinated sulfonamides, zwitterionic ionenes, ionomers, sulfonated polysulfones, sulfonated polyimides, sulfonated polyazoles, sulfonated silicones, polyimidazole, and derivatives thereof.

An improved proton exchange membrane includes a cross-linked ion-conducting polymer formed as the reaction product of a first polymer and a second polymer, the first polymer including an alkyne group, the second polymer including an azide group, the alkyne group and the azide group undergoing a cycloaddition reaction to form a triazole group. The first and second polymers may be the same species or different. An improved process for preparing a proton-conducting membrane comprises cross-linking a first polymer and a second polymer, the cross-linking step including a cycloaddition reaction between an azide group of the first polymer and an alkyne group of the second polymer to form a triazole group. Again, the first polymer and second polymer may be the same or different. The first polymer and/or the second polymer can be a proton-conducting polymer, such as an acidic proton-conducting polymer.

Embodiments of the present invention also include cross-linkable proton conducting polymers, for example a proton conducting polymer having both alkyne and azide groups. Examples include cross-linkable proton conducting polymers having substituent acid groups, alkyne groups, and azide groups. Examples include polymers of the form X—Y—Z, where X includes an acid group, Y is a polymer backbone, and Z includes an alkyne group and/or an azide group.

Hence, a process for making an ion-conducting polymer comprises cross-linking polymers having alkyne groups and azide groups. The ion-conducting polymer has cross-links including a 1,2,3-triazole group formed by a cycloaddition reaction between the alkyne and azide groups.

FIG. 1 is a highly simplified schematic of a conventional polymer electrolyte fuel cell, comprising first electrode 10, second electrode 12, proton-exchange membrane 14 disposed between the first and second electrodes, electrical load 16 electrically connected to the first and second electrodes, and a fuel source 18. For example, the fuel cell 18 may provide hydrogen gas to the first electrode, or anode, with atmospheric oxygen acting as fuel at the second electrode, or cathode. Water and electrons (which pass through the load) are produced during operation of the fuel cell. This illustration is not intended to be limiting, as a proton-exchange membrane according to the present invention can be used with any configuration of polymer electrolyte fuel cell. Fuel cells may further include other components, such as catalyst layers, current collectors, fuel and waste handling systems, and the like.

Hence, a fuel cell according to the present invention comprises a first electrode, a second electrode, a PEM disposed between the first and second electrodes, and a fuel source. The PEM includes a proton-conducting polymer according to an example of the present invention, for example having cross-links including a 1,4-disubstituted 1,2,3-triazole group.

A membrane electrode assembly (MEA) according to the present invention includes a first electrode, a second electrode, and an ion-exchange membrane according to the present invention sandwiched between the first and second electrodes. For example, referring again to FIG. 1, a MEA may comprise the first and second electrodes 10 and 12 sandwiching an ion-exchange membrane, in this case a proton exchange membrane, 14. A membrane electrode assembly according to the present invention may be used in an improved fuel cell or other apparatus.

Applications of ion exchange membranes according to the present invention include improved fuel cells, such as hydrogen fuel cells, direct methanol fuel cells, and other fuel cells. Other applications include electrochromic apparatus, capacitors, hydrogen separation and purification apparatus, apparatus for reforming or partial oxidation of hydrocarbon fuels, contaminant removal apparatus, gas sensors, electrolysis apparatus, dialysis apparatus, electrodialysis apparatus, other electrochemical devices, and other apparatus related to energy storage and conversion. The thickness of the ion-exchange membrane typically varies with the application. For fuel cell and other applications, the thickness can be between 0.05 and 0.5 mm, for example approximately 0.2 mm, though other thicknesses are possible. The ion-exchange membrane has appreciable ion conductivity.

An ion-exchange membrane may further include additional components to improve ion conductivity, such as free acid molecules (such as phosphoric, sulfuric acid, a solid inorganic acid, or free molecule containing one or more acid-groups), ion-conductive inorganic compounds, or another ion-conducting polymer (such as Nafion®), metal-particles, and the like. Ion-exchange membranes may also include water or other solvents. Other components can be included to improve mechanical properties, such as polymer fibers.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference. In particular, U.S. Provisional Patent Application Ser. No. 60/632,249, filed Dec. 1, 2004, is incorporated herein by reference.

Having described our invention, we claim:

1. A process for making an ion-conducting polymer, the process comprising:
   providing a first polymer having a first functional group;
   providing a second polymer having a second functional group; and
   cross-linking the first polymer and the second polymer using a cycloaddition reaction between the first functional group and the second functional group, so as to form the ion-conducting polymer,
   the ion-conducting polymer having cross-links including a nitrogen-containing heterocycle formed by the cycloaddition reaction.

2. The process of claim 1, wherein the first polymer and the second polymer are the same molecular species.

3. The process of claim 1, wherein the first functional group is an azide group, the second functional group is an alkyne group, and the nitrogen-containing heterocycle is a 1,4-substituted 1,2,3-triazole.

4. The process of claim 3, wherein the ion-conducting polymer is a proton-conducting polymer.

5. The process of claim 3, wherein the first polymer is an acid polymer.

6. The process of claim 5, wherein the first polymer and second polymer are both acid polymers.

7. The process of claim 5, wherein the first polymer includes sulfonic acid groups.

8. The process of claim 5, wherein the first polymer includes phosphonic acid groups.

9. The process of claim 3, wherein the process is a process for making a proton-exchange membrane including the proton-conducting polymer.

10. The process of claim 1, wherein the first polymer is selected from a group of polymers consisting of polyether ketones, sulfonated polystyrenes, sulfonated polyphenylenes, sulfonated trifluorostyrenes, sulfonated polyphosphazenes, fluoropolymers, fluorinated sulfonamides, zwitterionic ionenes, ionomers, sulfonated polysulfones, sulfonated polyimides, sulfonated polyazoles, sulfonated silicones, and polyimidazole.

11. A fuel cell including the proton-conducting membrane of claim 9.

12. An ion-exchange membrane, the membrane comprising:
   an ion-conducting polymer having cross-links,
   the cross-links including a 1,2,3-triazole group.

13. The ion-exchange membrane of claim 12, wherein the ion-exchange membrane is a proton-exchange membrane.

14. The ion-exchange membrane of claim 12, wherein the cross-linked polymer further has acid groups attached thereto.

15. The ion-exchange membrane of claim 14, wherein the acid groups are selected from a group of acid groups consisting of sulfonic acid, phosphonic acid, and boronic acid.

16. A fuel cell including the ion-exchange membrane of claim 12.

17. A membrane electrode assembly, comprising:
   a first electrode;
   a second electrode; and
   an ion-exchange membrane disposed between the first electrode and the second electrode,
   the ion-exchange membrane including a cross-linked ion-conducting polymer having cross-links, the cross-links including a 1,2,3-triazole group.

18. The membrane electrode assembly of claim 17, wherein the ion-exchange membrane is a proton-exchange membrane.

19. The membrane electrode assembly of claim 17, wherein the ion-conducting polymer is an acid polymer.

20. A fuel cell including the membrane electrode assembly of claim 18.

* * * * *

UNITED STATES PATENT AND TRADEMARK OFFICE
CERTIFICATE OF CORRECTION

PATENT NO. : 7,208,243 B2 Page 1 of 1
APPLICATION NO. : 11/290159
DATED : April 24, 2007
INVENTOR(S) : Wen Li et al.

It is certified that error appears in the above-identified patent and that said Letters Patent is hereby corrected as shown below:

Column 3, Line 36: replace the equation with the following:

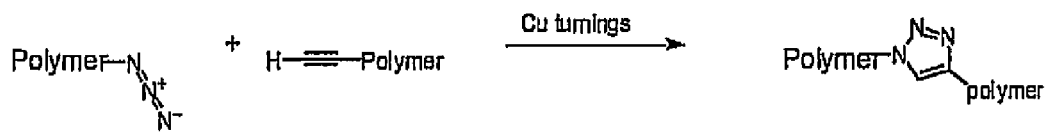

Signed and Sealed this

Twenty-fourth Day of July, 2007

JON W. DUDAS
*Director of the United States Patent and Trademark Office*